(No Model.)  2 Sheets—Sheet 1.

U. N. BEARDSLEY.
WIND ENGINE.

No. 261,985.  Patented Aug. 1, 1882.

Attest,
W. H. H. Knight
H. Bernhard

Inventor,
U. N. Beardsley
Per Edson Bro's
Attys (No Model.) 2 Sheets—Sheet 2.

U. N. BEARDSLEY.
WIND ENGINE.

No. 261,985. Patented Aug. 1, 1882.

Attest,
W. H. H. Knight
H. Bernhard.

Inventor,
U. N. Beardsley
Per Edson Bro.
Attys

UNITED STATES PATENT OFFICE.

UDNEY N. BEARDSLEY, OF BLOOMINGDALE, MICHIGAN.

WIND-ENGINE.

SPECIFICATION forming part of Letters Patent No. 261,985, dated August 1, 1882.

Application filed November 8, 1881. (No model.)

*To all whom it may concern:*

Be it known that I, UDNEY N. BEARDSLEY, a citizen of the United States, residing at Bloomingdale, in the county of Van Buren and State of Michigan, have invented certain new and useful Improvements in Wind-Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
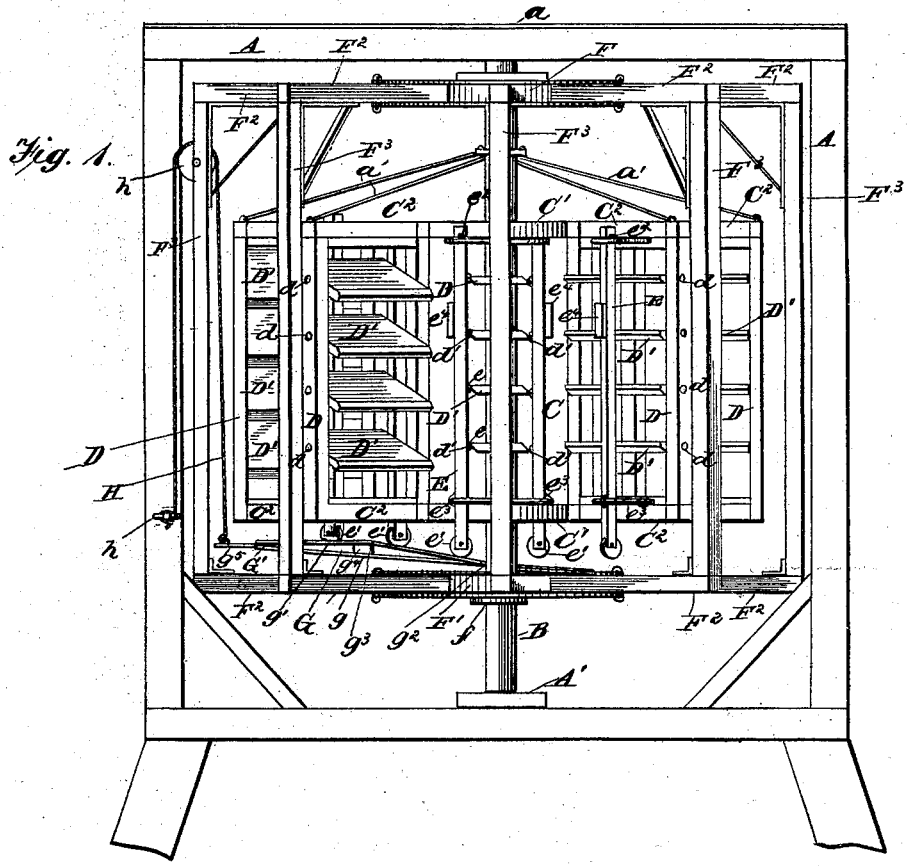
Figure 2:
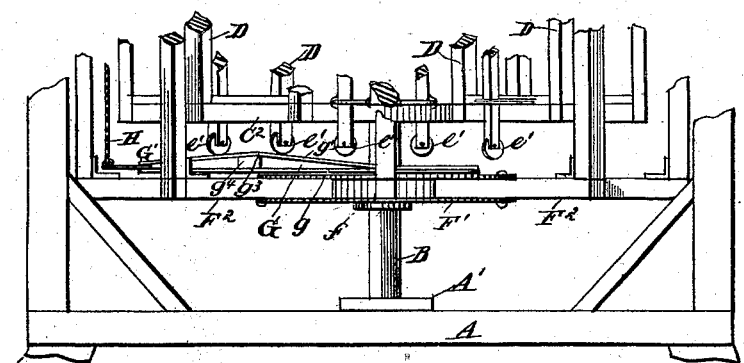
Figure 3:
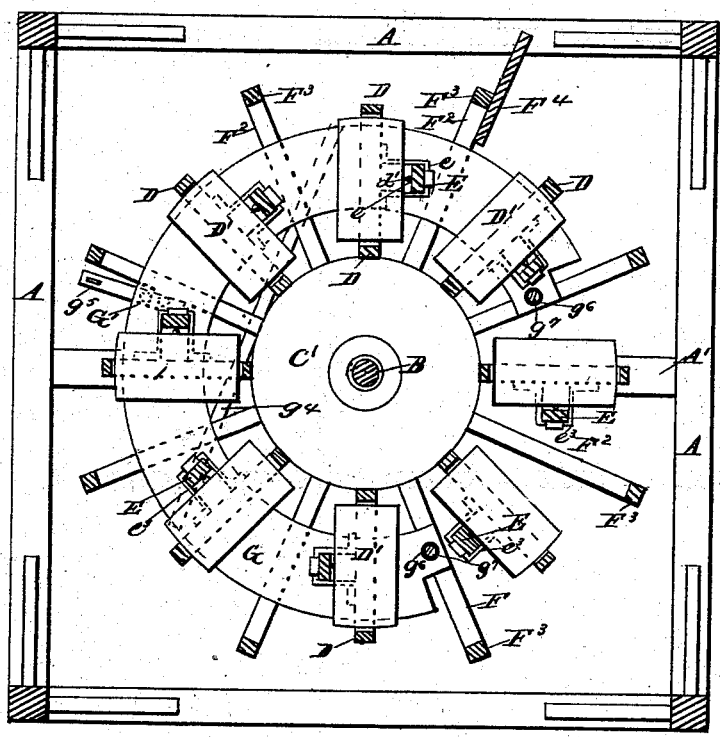

In the drawings, Figure 1 is a side elevation of my improved wind-engine, showing the operating cam-track raised and the blades of the fans in position to be operated upon by the wind. Fig. 2 represents a portion of the lower part of the engine, showing the cam-track lowered. Fig. 3 is a horizontal section of Fig. 1, and Figs. 4, 5, and 6 are detail views of parts of my invention.

Similar letters of reference in the several drawings denote similar parts.

My invention has for its object the provision of a wind-engine wherein the operating or wind wheel is mounted upon a vertical shaft within a second or skeleton wheel, said second or skeleton wheel being so arranged as to rotate upon the vertical driving-shaft, and provided with a tail-vane that operates to keep the same side of the wheel presented to the wind at all times, and further provided with a cam-track adapted to be raised or lowered from the ground, said cam-track operating to open or close the blades of the fans, and thus throw the operating-wheel into or out of motion.

The invention has further for its object the provision of means whereby the above-named wheels, together with their operating mechanism, may be protected from the weather.

Referring to the drawings, A represents the frame within which the operating-wheels are placed. The frame A is covered or roofed in, as shown $a$, at Fig. 1. The roof or cover $a$ may be either flat or may have inclined sides, as desired.

A' represents cross-timbers in which the vertical shaft B is mounted or stepped in suitable boxes.

C represents the wind-wheel, which I preferably construct as follows: C' represents circular disks attached rigidly to the shaft B. Extending outwardly from the disks C' are a series of arms or spokes, $C^2$. The disks are placed at a suitable distance from each other, and the arms or spokes thereof serve to support and hold in a vertical position a frame, D.

D' represents blades or fans pivoted at $d$ to the side rails of the frame D. Each of the blades or fans D' is provided at one edge, near the center thereof, with loops or eyes $d'$, into which corresponding loops or eyes, $e$, on rods E take. The rods E extend from the tops of the frames D to a point below the bottoms thereof, and their lower ends are provided with small rollers $e'$. The rods are limited in their downward motion by stop-pins $e^2$ near the upper end of each of said rods, said stop-pins resting upon the top of a guide-loop, $e^3$, through and by which the rods pass and are guided.

$e^3$ are links pivoted to the rods and to the lower rails of the frame D, and serve to further guide and strengthen said rods.

$e^4$ represents weights attached to the rear surface of each of the rods, thus insuring by the mechanism above described the opening of the blades D'.

The wheel A is further strengthened and kept in position upon the shaft B by straining rods that extend from a collar, $a'$, on the shaft to the outer free ends of the arms or spokes $C^2$.

F F' represent disks loosely mounted upon the vertical shaft B, one side of said disks being above and the other below the wheel A, and the lower bearing or resting upon a collar, $f$, secured to the shaft. The disks F F' are provided with arms or spokes $F^2$, preferably eight in number, the outer ends of which are connected by vertical timbers $F^3$, thus forming a second wheel, which I term a "skeleton wheel," free to revolve upon the shaft. To one of the vertical timbers $F^3$ I attach a tail-vane, whereby the opposite side of the wheel is kept at all times presented to the wind.

Extending partly around the outer wheel, and at the lower side thereof, is a cam-track, G, said track consisting of two plates, $g\ g'$, the lower of which, $g$, is flat upon its under and upper surfaces, while the upper plate, $g'$, is flat for a portion of its length, said flat portion extending from its ends to points $g^2$. Thence it is bent upward, forming a slight rise, said rise occurring between the points $g^2\ g^3$, and thence downward to the plate $g$. To further strengthen and support the cam-track thus formed a cross-timber, $g^4$, is interposed between the plates at the points $g^3$, said timber extending from side to side, as shown.

Figures 4, 5:
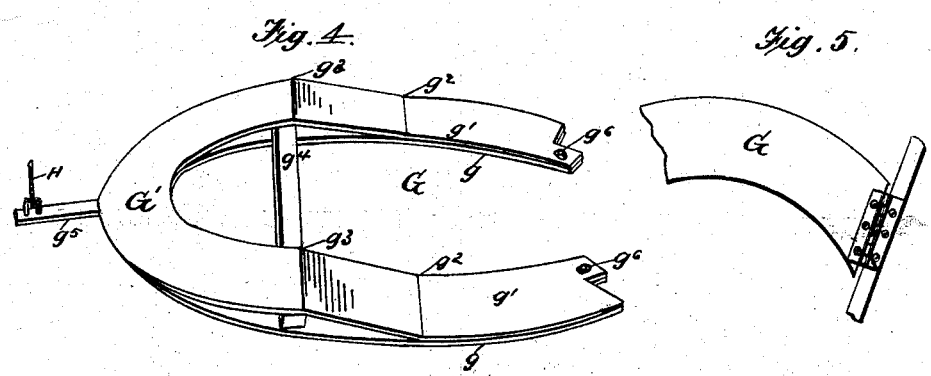
Figure 6:
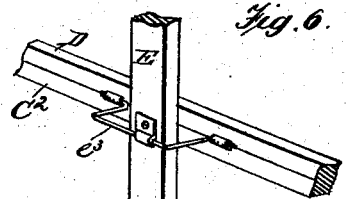

The cam-track normally rests upon the lower spokes, $F^2$, of the outer wheel, when the wind or operating wheel is not in motion; but when it is desired to set said wheel in motion the side or end $G'$ of the cam-track is raised by means of a cord, H, that passes over a pulley, $h$, on one side of the vertical timbers $F^3$, to a projecting arm or stud, $g^5$, extending from the track G, the outer end of the cord being secured to a cleat, $h'$, when the desired height of the track is attained. The track is permitted to rise freely without slipping backward by the following means: Each of the rear ends of the track is provided with an aperture, $g^6$, through which pass pins $g^7$, and into the spokes, as shown, Fig. 3. Instead of the above-described manner of pivoting the track to the spokes, a hinged connection may be made, as shown in Fig. 5.

The outer wheel is prevented from sagging by means of braces extending from the vertical timbers $F^3$ to the upper series of spokes, as shown in Fig. 1.

If desired, brace-rods may extend from one to the other of the vertical timbers $F^3$, and also from one to the other of the frame D.

The operation of my improved wind-engine is as follows: When it is desired to throw the wind-wheel into motion the outer end of the cam G is raised, thus raising the bars or rods E directly over the bent parts of the upper plate, $g'$, of said cam, and closing the blades attached to said rods E, as shown in Fig. 1. The wind operates to force the wind around, and thus in turn each frame is brought over the elevated part of the cam-track G.

As will be readily seen, the extent to which the blades $D'$ are opened or closed may be governed by the distance to which the track G is raised by the cord H.

Having thus fully described my invention, what I claim, and desire to secure by Letters Patent, is—

1. In a horizontal wind-engine, the combination of the wind-wheel C, rigidly attached to the vertical shaft B, with the outer wheel loosely mounted upon said shaft B, and provided with cam-track G, substantially as described, for the purpose specified.

2. In a horizontal wind-engine, the wind-wheel C, having disks $C'$, arms or spokes $C^2$, vertical frames D, provided with blades $D'$, loops $d'$, and bars or rods E, constructed and arranged substantially as described, for the purpose specified.

3. In a horizontal wind-wheel, the outer skeleton wheel having disks F $F'$, loosely mounted on the vertical shaft B, arms or spokes $F^2$, vertical timbers $F^3$, and tail-vane $F^4$, substantially as described, for the purpose specified.

4. In a horizontal wind-engine, the cam-track G, having plates $g\ g'$, timber $g^4$, stud $g^5$, and aperture $g^6$, in combination with suitably-supported blades D and means for operating them, substantially as described.

5. In a horizontal wind-engine, the combination of the cam-track G, having plates $g\ g'$, and stud $g^5$, with the outer or skeleton wheel having disks F $F'$, loosely mounted on the shaft B, arms $F^2$, vertical timbers $F^3$, tail-vane $F^4$, suitably-supported blades D, and means for operating them.

6. In a horizontal wind-engine, the combination of the cam-track having plates $g\ g'$, with the wind-wheel C, having disks $C'$, arms or spokes $C^2$, and vertical frames D, provided with the blades $D'$, arranged to be opened or closed by said cam G, substantially in the manner described and set forth.

In testimony whereof I affix my signature in presence of two witnesses.

UDNEY N. BEARDSLEY.

Witnesses:
UDNEY A. BEARDSLEY,
WM. KILLEFER.